(12) United States Patent
Bhogal et al.

(10) Patent No.: US 12,185,862 B2
(45) Date of Patent: Jan. 7, 2025

(54) SYSTEM AND METHOD FOR TARGETED HEATING ELEMENT CONTROL

(71) Applicant: June Life, LLC, San Francisco, CA (US)

(72) Inventors: Nikhil Bhogal, San Francisco, CA (US); Nishit Kumar, San Francisco, CA (US); Christopher Russell Clark, San Francisco, CA (US); Jithendra Paruchuri, San Francisco, CA (US); Robert Cottrell, San Francisco, CA (US)

(73) Assignee: June Life LLC, San Francisco, CA (US)

( * ) Notice: Subject to any disclaimer, the term of this patent is extended or adjusted under 35 U.S.C. 154(b) by 624 days.

(21) Appl. No.: 17/403,472

(22) Filed: Aug. 16, 2021

(65) Prior Publication Data
US 2022/0047109 A1 Feb. 17, 2022

Related U.S. Application Data

(60) Provisional application No. 63/065,787, filed on Aug. 14, 2020.

(51) Int. Cl.
A47J 27/00 (2006.01)
A47J 37/06 (2006.01)
(Continued)

(52) U.S. Cl.
CPC ......... A47J 27/004 (2013.01); A47J 37/0623 (2013.01); G06T 7/0008 (2013.01);
(Continued)

(58) Field of Classification Search
CPC ...... H05B 6/6447; H05B 6/686; H05B 6/705; H05B 6/688; A47J 27/004; A47J 37/0623;
(Continued)

(56) References Cited

U.S. PATENT DOCUMENTS 3,453,997 A 7/1969 Klepzig
3,911,893 A 10/1975 Baker et al.
(Continued)

FOREIGN PATENT DOCUMENTS

CN 1900858 A 1/2007
CN 101044362 A 9/2007
(Continued)

OTHER PUBLICATIONS

U.S. Appl. No. 12/216,999, filed Jul. 14, 2008, Kim, et al.
(Continued)

Primary Examiner — Brian W Jennison
(74) Attorney, Agent, or Firm — Banner & Witcoff Ltd.

(57) ABSTRACT

A method for targeted heating element control can include: sampling measurements, determining one or more occupied regions based on the measurements, determining one or more food types, controlling appliance operation based on the occupied regions and food types, optionally providing real-time feedback to the user for food placement within the cavity, optionally sampling training measurements, optionally determining a cavity occupancy region classifier, and/or any other suitable elements.

20 Claims, 11 Drawing Sheets

(51) Int. Cl.
*G06T 7/00* (2017.01)
*G06T 7/11* (2017.01)
*G06T 7/70* (2017.01)

(52) U.S. Cl.
CPC ............... *G06T 7/11* (2017.01); *G06T 7/70* (2017.01); *G06T 2207/20084* (2013.01); *G06T 2207/30128* (2013.01)

(58) Field of Classification Search
CPC ......... G06T 7/11; G06T 7/70; G06T 2207/20; G06T 2207/30; G06T 7/0008
See application file for complete search history.

(56) References Cited

U.S. PATENT DOCUMENTS

| | | |
|---|---|---|
| 4,363,957 A | 12/1982 | Tachikawa et al. |
| 4,415,790 A | 11/1983 | Diesch et al. |
| 4,591,684 A | 5/1986 | Tanabe et al. |
| 5,154,940 A | 10/1992 | Budzyna et al. |
| 5,170,024 A | 12/1992 | Hanatani et al. |
| 5,360,965 A | 11/1994 | Ishii et al. |
| 5,361,681 A | 11/1994 | Hedstroem et al. |
| 5,412,448 A | 5/1995 | Kunishige |
| 5,498,856 A | 3/1996 | Carlsson |
| 5,520,095 A | 5/1996 | Huber et al. |
| 5,546,475 A | 8/1996 | Bolle et al. |
| 5,918,589 A | 7/1999 | Valle et al. |
| 5,981,916 A | 11/1999 | Griffiths et al. |
| 6,011,242 A | 1/2000 | Westerberg |
| 6,060,701 A | 5/2000 | McKee et al. |
| 6,299,921 B1 | 10/2001 | Loeffler et al. |
| 6,310,964 B1 | 10/2001 | Mohan et al. |
| 6,359,270 B1 | 3/2002 | Bridson |
| 6,384,384 B1 | 5/2002 | Connolly et al. |
| 6,486,453 B1 | 11/2002 | Bales et al. |
| 6,759,635 B2 | 7/2004 | Lile |
| 6,789,067 B1 | 9/2004 | Liebenow |
| 6,821,016 B2 | 11/2004 | Sato et al. |
| 6,856,247 B1 | 2/2005 | Wallace |
| 6,862,494 B2 | 3/2005 | Hu et al. |
| 7,013,661 B2 | 3/2006 | Gatling et al. |
| 7,102,107 B1 | 9/2006 | Chapman |
| 7,150,891 B2 | 12/2006 | Greiner et al. |
| 7,445,381 B2 | 11/2008 | Rund et al. |
| 7,516,692 B2 | 4/2009 | Pirkle et al. |
| 7,566,168 B2 | 7/2009 | Rund et al. |
| 7,663,502 B2 | 2/2010 | Breed |
| 7,845,823 B2 | 12/2010 | Mueller et al. |
| 7,973,642 B2 | 7/2011 | Schackmuth et al. |
| 8,091,543 B2 | 1/2012 | Baumann et al. |
| 8,193,474 B2 | 6/2012 | Harris |
| 8,426,777 B2 | 4/2013 | Elston et al. |
| 8,555,776 B2 | 10/2013 | Debord et al. |
| 8,766,144 B2 | 7/2014 | McLoughlin et al. |
| 8,931,400 B1 | 1/2015 | Allen |
| 9,017,751 B2 | 4/2015 | Rauh |
| 9,041,799 B2 | 5/2015 | Bielstein |
| 9,069,340 B2 | 6/2015 | Minvielle |
| 9,149,058 B2 | 10/2015 | Bilet et al. |
| 9,414,444 B2 | 8/2016 | Libman et al. |
| 9,460,633 B2 | 10/2016 | Minvielle |
| 9,494,322 B2 | 11/2016 | Luckhardt et al. |
| 9,528,972 B2 | 12/2016 | Minvielle |
| 9,564,064 B2 | 2/2017 | Minvielle |
| 9,644,847 B2 | 5/2017 | Bhogal et al. |
| 9,664,436 B1 | 5/2017 | Hall et al. |
| 9,791,206 B1 | 10/2017 | Hall et al. |
| 9,927,129 B2 | 3/2018 | Bhogal et al. |
| 9,933,166 B2 | 4/2018 | Matarazzi et al. |
| 10,024,544 B2 | 7/2018 | Bhogal et al. |
| 10,024,736 B2 | 7/2018 | Nivala et al. |
| 10,057,946 B2 | 8/2018 | Mills et al. |
| 10,092,129 B2 | 10/2018 | Jenkins et al. |
| 10,207,734 B2 | 2/2019 | Watanabe |
| 10,559,186 B2 | 2/2020 | Allen |
| 10,739,013 B2 | 8/2020 | Bhogal |
| 10,801,734 B2 | 10/2020 | Bhogal et al. |
| 10,845,060 B2 | 11/2020 | Bhogal et al. |
| 10,852,005 B2 | 12/2020 | Faraldi et al. |
| 2002/0005406 A1 | 1/2002 | Fukunaga et al. |
| 2003/0047553 A1 | 3/2003 | Patti et al. |
| 2003/0139843 A1 | 7/2003 | Hu et al. |
| 2004/0104222 A1 | 6/2004 | Lee |
| 2005/0046584 A1 | 3/2005 | Breed |
| 2005/0047134 A1 | 3/2005 | Mueller et al. |
| 2005/0133019 A1 | 6/2005 | Kim et al. |
| 2005/0193901 A1 | 9/2005 | Buehler |
| 2006/0185523 A1 | 8/2006 | Wiedemann et al. |
| 2006/0218057 A1 | 9/2006 | Fitzpatrick et al. |
| 2006/0219234 A1 | 10/2006 | Larsen |
| 2007/0001012 A1 | 1/2007 | Kim et al. |
| 2007/0007279 A1 | 1/2007 | Chun et al. |
| 2007/0029306 A1 | 2/2007 | Chun et al. |
| 2007/0042091 A1 | 2/2007 | Rund et al. |
| 2007/0125760 A1 | 6/2007 | Kim et al. |
| 2007/0215599 A1 | 9/2007 | Kahler |
| 2008/0029078 A1 | 2/2008 | Baumann et al. |
| 2008/0032018 A1 | 2/2008 | Garniss et al. |
| 2008/0043809 A1 | 2/2008 | Herbert |
| 2008/0120188 A1 | 5/2008 | Mobley et al. |
| 2008/0193614 A1 | 8/2008 | Greiner et al. |
| 2008/0274240 A1 | 11/2008 | Germouni et al. |
| 2009/0134151 A1 | 5/2009 | Bogatin et al. |
| 2009/0274805 A1 | 11/2009 | Schonemann |
| 2010/0006558 A1 | 1/2010 | McLoughlin et al. |
| 2010/0021606 A1 | 1/2010 | Rauh |
| 2010/0134620 A1 | 6/2010 | Bielstein |
| 2010/0138075 A1 | 6/2010 | Boer et al. |
| 2010/0145483 A1 | 6/2010 | McGonagle et al. |
| 2010/0147823 A1 | 6/2010 | Anderson et al. |
| 2010/0320189 A1 | 12/2010 | Buchheit |
| 2011/0002677 A1 | 1/2011 | Cochran et al. |
| 2011/0022211 A1 | 1/2011 | McIntyre et al. |
| 2011/0123689 A1 | 5/2011 | Luckhardt et al. |
| 2011/0127252 A1 | 6/2011 | Yu et al. |
| 2011/0253693 A1 | 10/2011 | Lyons et al. |
| 2011/0284518 A1 | 11/2011 | Elston et al. |
| 2012/0017882 A1 | 1/2012 | Kitaguchi et al. |
| 2012/0038549 A1 | 2/2012 | Mandella et al. |
| 2012/0076351 A1 | 3/2012 | Yoon et al. |
| 2012/0099761 A1 | 4/2012 | Yoon et al. |
| 2012/0100269 A1 | 4/2012 | Polt |
| 2012/0125921 A1 | 5/2012 | Shim et al. |
| 2012/0157696 A1 | 6/2012 | Chopra et al. |
| 2012/0170247 A1 | 7/2012 | Do |
| 2012/0288595 A1 | 11/2012 | Randall et al. |
| 2013/0052310 A1 | 2/2013 | Stanford |
| 2013/0084369 A1 | 4/2013 | Smrke |
| 2013/0092680 A1 | 4/2013 | Cartwright et al. |
| 2013/0092682 A1 | 4/2013 | Mills et al. |
| 2013/0171304 A1 | 7/2013 | Huntley |
| 2013/0176116 A1 | 7/2013 | Jung et al. |
| 2013/0186887 A1 | 7/2013 | Hallgren et al. |
| 2013/0269539 A1 | 10/2013 | Polt |
| 2013/0277353 A1 | 10/2013 | Joseph et al. |
| 2013/0302483 A1 | 11/2013 | Riefenstein |
| 2013/0306052 A1 | 11/2013 | Price et al. |
| 2013/0306627 A1 | 11/2013 | Libman et al. |
| 2014/0026762 A1 | 1/2014 | Riefenstein |
| 2014/0039650 A1 | 2/2014 | Baraille et al. |
| 2014/0086274 A1 | 3/2014 | Henke |
| 2014/0199455 A1 | 7/2014 | Bilet et al. |
| 2014/0203012 A1 | 7/2014 | Corona et al. |
| 2014/0242227 A1 | 8/2014 | Yang et al. |
| 2014/0297467 A1 | 10/2014 | Soller et al. |
| 2015/0056344 A1 | 2/2015 | Luckhardt |
| 2015/0136760 A1 | 5/2015 | Lima et al. |
| 2015/0285513 A1 | 10/2015 | Matarazzi et al. |
| 2015/0289324 A1 | 10/2015 | Rober et al. |
| 2016/0063734 A1 | 3/2016 | Divakaran et al. |
| 2016/0098465 A1 | 4/2016 | Wu et al. |
| 2016/0192446 A1* | 6/2016 | Seddik .............. H05B 6/6455 219/705 |

(56) References Cited

U.S. PATENT DOCUMENTS

| | | | |
|---|---|---|---|
| 2016/0242240 A1 | 8/2016 | Lee et al. | |
| 2016/0273778 A1 | 9/2016 | Son et al. | |
| 2016/0278563 A1 | 9/2016 | Choudhary | |
| 2016/0283822 A1 | 9/2016 | Imai et al. | |
| 2016/0296055 A1 | 10/2016 | Schilling | |
| 2016/0302265 A1 | 10/2016 | Kreiner | |
| 2016/0327279 A1* | 11/2016 | Bhogal | F24C 15/008 |
| 2016/0327281 A1 | 11/2016 | Bhogal et al. | |
| 2017/0011649 A1 | 1/2017 | Lee et al. | |
| 2017/0074522 A1 | 3/2017 | Cheng | |
| 2017/0116661 A1 | 4/2017 | Sundaram | |
| 2017/0132950 A1 | 5/2017 | Harrison | |
| 2017/0150842 A1 | 6/2017 | Young et al. | |
| 2017/0176019 A1 | 6/2017 | Bhogal et al. | |
| 2017/0224161 A1 | 8/2017 | Li et al. | |
| 2017/0332841 A1 | 11/2017 | Reischmann | |
| 2018/0101608 A1 | 4/2018 | Thysell | |
| 2018/0172510 A1 | 6/2018 | Rosen et al. | |
| 2018/0202667 A1 | 7/2018 | Cheng | |
| 2018/0292093 A1 | 10/2018 | Bhogal et al. | |
| 2018/0299138 A1 | 10/2018 | Faraldi et al. | |
| 2018/0324908 A1* | 11/2018 | Denker | H05B 6/6467 |
| 2019/0110638 A1* | 4/2019 | Li | A47J 36/32 |
| 2019/0200652 A1 | 7/2019 | Jellema et al. | |
| 2019/0234617 A1 | 8/2019 | Bhogal et al. | |
| 2019/0242584 A1 | 8/2019 | Ebert et al. | |
| 2019/0250043 A1 | 8/2019 | Wu et al. | |
| 2019/0354810 A1 | 11/2019 | Samel et al. | |
| 2020/0063978 A1 | 2/2020 | Erbe et al. | |
| 2020/0069103 A1 | 3/2020 | Baldwin et al. | |
| 2020/0088412 A1 | 3/2020 | Bhogal et al. | |
| 2020/0096203 A1 | 3/2020 | Bhogal et al. | |
| 2020/0103120 A1 | 4/2020 | Bhogal et al. | |
| 2020/0182480 A1 | 6/2020 | Bhogal et al. | |
| 2020/0182481 A1 | 6/2020 | Bhogal et al. | |
| 2020/0292177 A1 | 9/2020 | Bhogal et al. | |
| 2020/0300479 A1 | 9/2020 | Chadwick et al. | |
| 2020/0400317 A1 | 12/2020 | Bhogal et al. | |
| 2021/0102708 A1 | 4/2021 | Bhogal et al. | |
| 2021/0131669 A1 | 5/2021 | Bhogal et al. | |
| 2021/0148577 A1 | 5/2021 | Bhogal et al. | |

FOREIGN PATENT DOCUMENTS

| | | |
|---|---|---|
| CN | 101504158 A | 8/2009 |
| CN | 201353794 Y | 12/2009 |
| CN | 202392848 U | 8/2012 |
| CN | 103234228 A | 8/2013 |
| CN | 103501618 A | 1/2014 |
| CN | 103592227 A | 2/2014 |
| CN | 104042124 A | 9/2014 |
| CN | 203914599 U | 11/2014 |
| CN | 104246375 A | 12/2014 |
| DE | 19828333 A1 | 12/1999 |
| DE | 102005030483 A1 | 1/2007 |
| DE | 202008000135 | 3/2008 |
| DE | 102008043722 A1 | 5/2010 |
| DE | 102012204229 A1 | 9/2013 |
| DE | 102017220884 A1 | 5/2019 |
| EP | 0298858 A1 | 1/1989 |
| EP | 0899512 A1 | 3/1999 |
| EP | 1179711 A1 | 2/2002 |
| EP | 1746350 A2 | 1/2007 |
| EP | 2149755 A1 | 2/2010 |
| EP | 2515044 A1 | 10/2012 |
| EP | 2618634 A1 | 7/2013 |
| GB | 1163509 A | 9/1969 |
| GB | 1195750 A | 6/1970 |
| JP | 11-63509 | 3/1999 |
| JP | 2004187778 A | 7/2004 |
| JP | 2005276171 A | 10/2005 |
| JP | 201353794 | 3/2013 |
| WO | 2006128696 A1 | 12/2006 |
| WO | 2007022507 A2 | 2/2007 |
| WO | 2009012874 A2 | 1/2009 |
| WO | 2013167333 A1 | 11/2013 |
| WO | 2014086486 A2 | 6/2014 |
| WO | 2014086487 A1 | 6/2014 |
| WO | 2015059931 A1 | 4/2015 |
| WO | 2015192117 A1 | 12/2015 |
| WO | 2018162451 A1 | 9/2018 |
| WO | 2019232113 A1 | 12/2019 |
| WO | 2020077501 A1 | 4/2020 |

OTHER PUBLICATIONS

U.S. Appl. No. 13/059,486, filed Aug. 26, 2009, Sakane, et al.
U.S. Appl. No. 13/978,413, filed Apr. 19, 2012, Ruther.
U.S. Appl. No. 14/205,587, filed Mar. 12, 2014, Chadwick, et al.
U.S. Appl. No. 14/205,593, filed Mar. 12, 2014, Chadwick, et al.
U.S. Appl. No. 15/510,544, filed Oct. 9, 2015, Kondo, et al.
"Automated Fruit Recognition for Super Markets and Food Stores, Fraunhofer, http://www.iosb.fraunhofer.de/servlet/is/33328/, accessed online Nov. 13, 2014."
"Electrolux launches CombiSteam Pro Smart", http://www.homeappliancesworld.com/2018/03/08/electrolux-launches-combisteam-pro-smart/, downloaded from internet on Jan. 18, 2019, 2 pages.
Fang, Chi et al. "Cooking Time Optimization on Given Machine Constraints and Order Constraints" Integer Programming Approach, Dec. 17, 2016.
https://www.greatgrubdelicioustreats.com/fried-egg-grilled-cheese-sandwich/; "Great Grub, Delicious Treats"; Nov. 29, 2015; download date Apr. 13, 2021; pp. 1-24.
Karimi,Davood "Deep learning with noisy labels: exploring techniques and remedies in medical image analysis" arXiv:1912.02911v4 [cs.CV] Mar. 20, 2020.
Sun, Da-Wen; "Computer Vision Technology For Food Quality Evaluation", Second Edition, Academic Press, 2016.
"Colloids, Gels and Suspensions", https://kitchenscience.scitoys.com/Gels (c) 2021 included as "Colloids_Gels_and_Suspensions_Your_Mother_Was_A_Chemist.pdf", 2021.
"Cooking with Brava", https://www.brava.com/welcome/CookingWithBrava.
"Cooking with Light", https://blog.brava.com/2020/02/27/cooking-with-light/.
"Steam Characteristics", ThermExcel, https://therexcel.com/english/taples/vap_eau.htm, included as thermExcel_steam_charateristics_2003.pdf, 2003.
"The Brava Tutorial—Youtube", https://www.youtube.com/watch?v=ZoW4iSb5U5k&t=1992s, Oct. 1, 2020.
"The Level Oven", https://level.ai.
Chen, Pengfei, et al., "Understanding and Utilizing Deep Neural Networks Trained with Noisy Labels", Proceeding of the 36th International Conference on Machine Learning, Long Beach, California, PMLR 97, 2019.
Harris, William, "How Molecular Gastronomy Works", https://science.howStuffWorks.com/innovation/edible-innovations/molecular-gastronomy.htm accessed in 2021 included as "HowStuffWorks_How_Molecular_Gastronomy_Works.pdf", 2021.
Li, Xin, et al., "On-Line Temperature Estimation for Noisy Thermal Sensors Using a Smoothing Filter-Based Kalman Predictor", Sensors, 2018, 18, 433, www.mdpi.com/journal/sensors.
Reitermanova, Z., et al., "Data Splitting", WDS '10 Proceedings of Contributed Papers, Part I, 31-36, 2010.

* cited by examiner

SYSTEM AND METHOD FOR TARGETED HEATING ELEMENT CONTROL

CROSS-REFERENCE TO RELATED APPLICATIONS

This application claims the benefit of U.S. Provisional Application Ser. No. 63/065,787 filed 14 Aug. 2020, which is incorporated in its entirety by this reference.

TECHNICAL FIELD

This invention relates generally to the field of appliances, and more specifically to a new and useful method for targeted heating element control in appliances in the appliance field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. OVERVIEW

Figure 1:
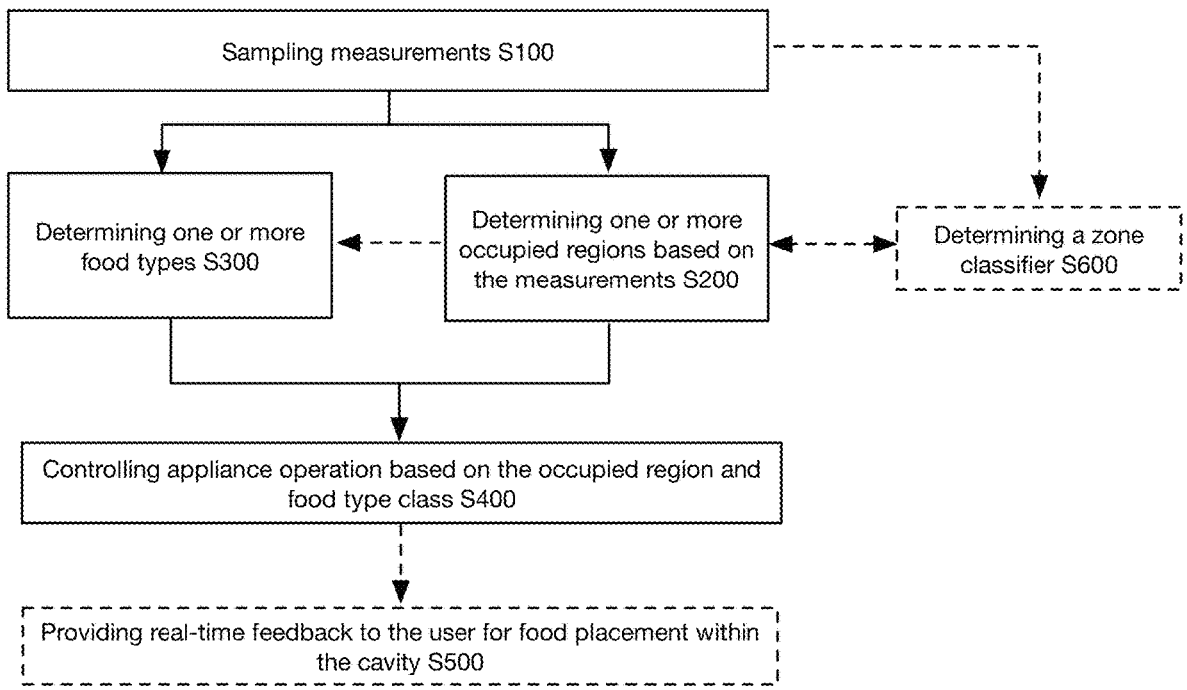
FIG. 1 is a schematic representation of the method.

As shown in FIG. 1, the method for targeted heating element control can include: sampling measurements S100, determining one or more occupied regions based on the measurements S200, determining one or more food types S300, controlling appliance operation based on the occupied regions and food types S400, optionally providing real-time feedback to the user for food placement within the cavity S500, optionally determining a cavity occupancy region classifier Shoo, and/or any other suitable elements.

Figure 2:
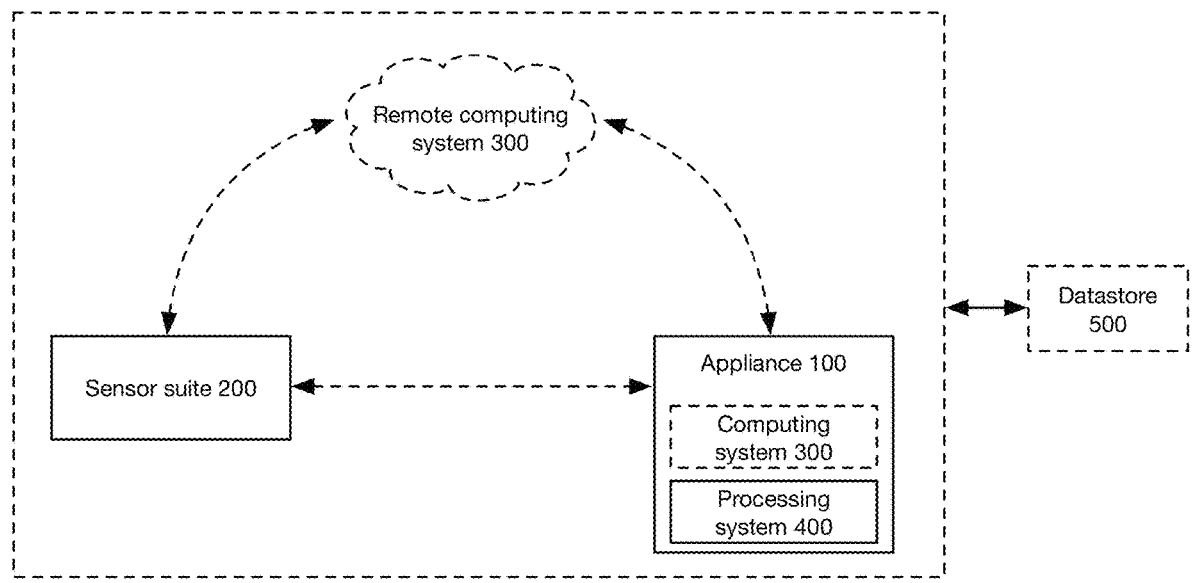
FIG. 2 is a schematic representation of the system.

As shown in FIG. 2, the system for targeted heating element control can include one or more appliances, and one or more computing systems, and/or any other suitable components.

2. EXAMPLES

In an example, the method can include: capturing one or more images of the appliance's cavity using an appliance camera; determining a zone class for the food, wherein the zone class can be associated with one of a plurality of zones, a combination of zones, or no zone (e.g., empty cavity); determining a food type class using the one or more images; and controlling appliance operation based on the zone class and the food type class (e.g., automatically controlling heating elements associated with the zone class according to cooking instructions associated with the food type class, etc.). Additionally or alternatively, the method can include providing real-time feedback to the user for optimal food placement within a particular zone or zone combination.

The method can optionally include: capturing one or more training images of the appliance's cavity using the appliance camera and determining a food zone classifier, which can include generating training data using the training images and predefined zones.

3. BENEFITS

The system and method can confer several benefits over conventional systems.

First, automated appliances, such as smart ovens, can be designed to reduce manual control and cognitive overhead by automatically controlling appliance operation. Enabling such user experience can include determining parameters such as the food type and placement within the cavity, such that the appliance can automatically select or adjust an instruction based on the identified parameters. Such parameters can be also used to cook a combination of food types within the same cavity.

Second, automated appliances can be designed to optimize use of the appliance by including individually controllable heating elements. Instead of heating the entire cavity to the same temperature to cook food, the individually controllable heating elements can direct radiant heat to cook food based on the location of the food in the cavity. Directing radiant heat to cook food items can reduce power consumption and shorten cook times. Further, directing radiant heat can enable different food types to be concurrently cooked in the same cook cavity to different temperatures, different doneness, or other variable parameters.

Third, variants of the system can enable more accurate and/or faster zone determination. In an example, zones can be determined using a classifier instead of an object detector. In another example, the system identifies discrete zones instead of arbitrary locations.

However, the method and system can confer any other suitable benefits.

4. SYSTEM

The method is preferably performed using a system including: an appliance 100, one or more sensors 200, one or more computing systems (e.g., local, remote, etc.) 300, one or more processing systems 400, one or more datastores 500, and/or any other suitable components. However, the method can be performed with any other suitable system.

Figure 7:
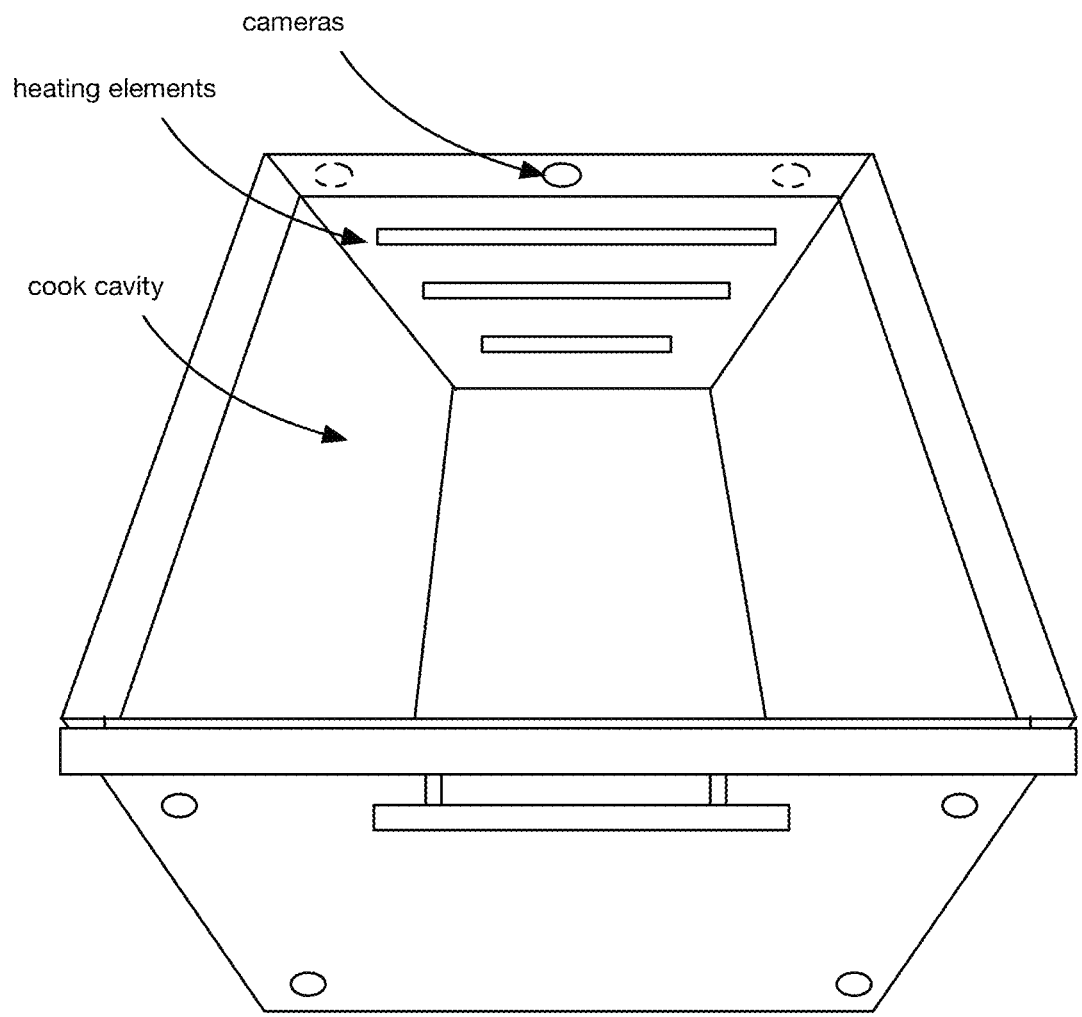
FIGS. 7-9 depict variants of the system.
Figure 8:
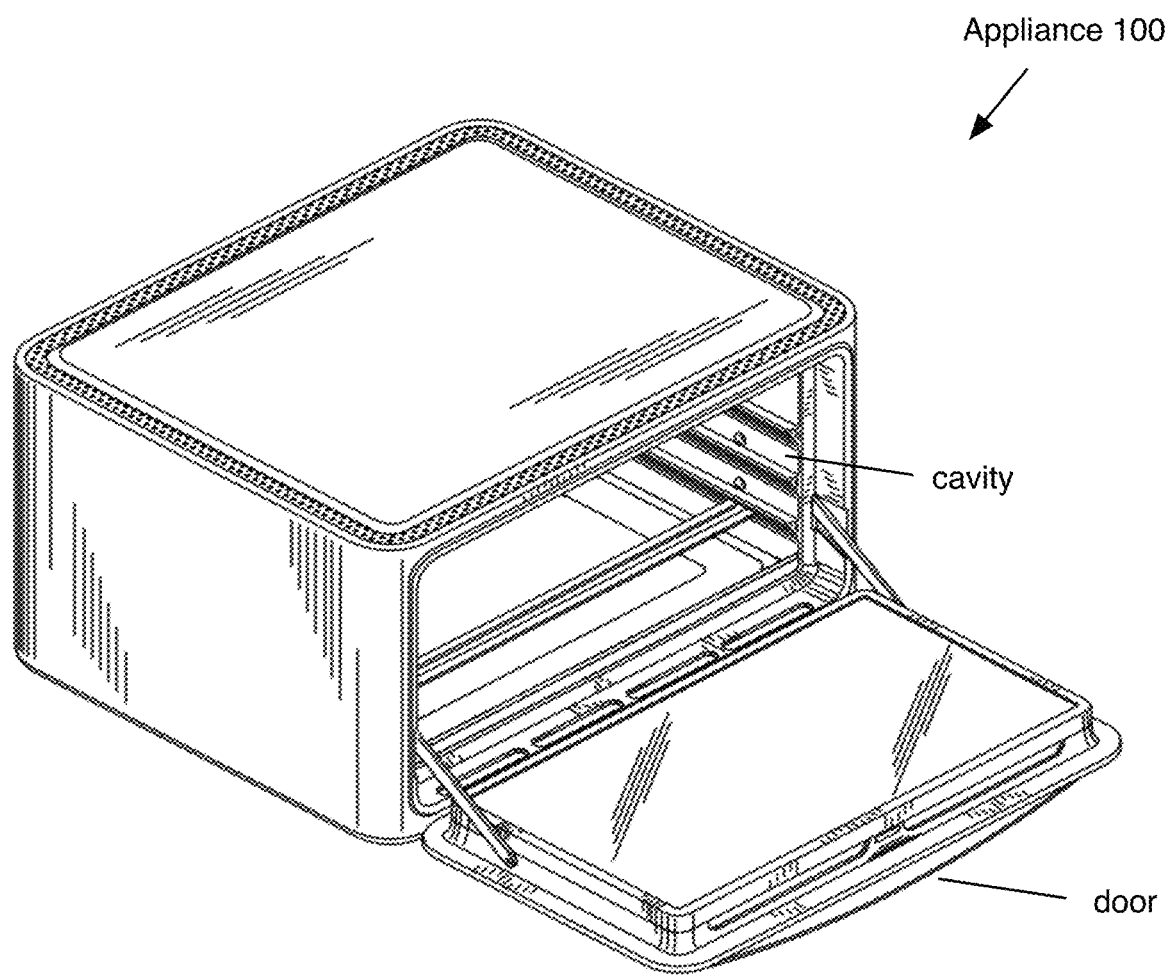
Figure 9:
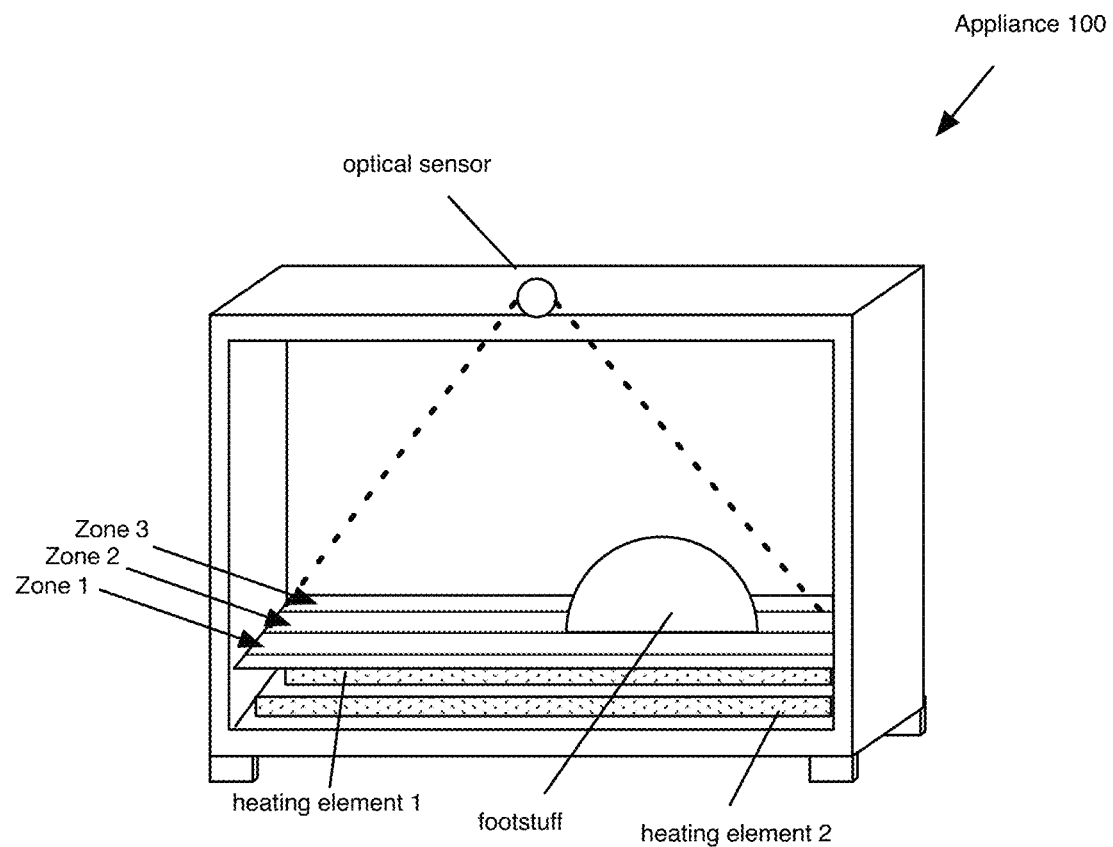

The appliance can function to perform one or more processes of the method. The appliance can include: a housing, which can define a cooking cavity; one or more racks or support surfaces located within the cooking cavity; and one or more heating elements located within or relative to the cooking cavity (e.g., left, right, bottom, top, back, etc.). The appliance can optionally include a sealing component (e.g., a lid, a door, etc.) one or more communication systems (e.g., APIs, Wifi system, cellular system, Bluetooth system, etc.); and/or any other suitable components. The appliance can be a commercial oven, an industrial oven, a conventional oven, a convection oven, a grill (e.g., charcoal grill, electric grill, a gas grill (e.g., using propane or other flammable fuel), a smoker, a pizza oven, an appliance operable above a temperature threshold (e.g., 500° F., 450° F., etc.), and/or any other suitable appliance. Examples of the appliance are depicted in FIGS. 7-9. A specific example of an appliance is described in U.S. application Ser. No.

16/380,894 filed 10 Apr. 2019, which is incorporated herein in its entirety by this reference. However, the appliance can be otherwise configured.

The one or more heating elements (e.g., 1, 2, 2-10, 3-7, 6, 7, 8, 9, 10-20, more than 20 heating elements, etc.) can be evenly or unevenly distributed along a cavity surface. The heating elements can be positioned on the top of the appliance cavity, the bottom, the sides, the back, and/or otherwise positioned along a cavity surface. The heating elements can direct heat from the top-down, bottom-up, at an angle relative to a gravity vector (e.g., less than 45 degrees, more than 45 degrees, less than 90 degrees, more than 90 degrees, between 30-50 degrees, between 20-170 degrees, etc.), and/or otherwise positioned. The heating elements can be arranged front-to-back, left to right, edge-to-edge, in a grid, array, and/or in any other arrangement. The heating elements are preferably individually addressable and/or controllable, but can alternatively be addressable in particular combinations (e.g., pairs, trios, etc.; such as adjacent pairs, top-bottom pairs, etc.), or not individually addressable. The heating elements can have adjustable power output (e.g., range from 0-100%, 0-10 associated with the minimum and maximum power, etc.), binary power output, and/or any other suitable power output. The heating elements can be metal, ceramic, carbon fiber, composite (e.g., tubular sheathed heating element, screen-printed metal-ceramic tracks, etc.), or otherwise constructed. The heating elements can be standard burner tubes, infrared burner tubes, and/or any other suitable burner tube. The heating elements can transfer heat using conduction, convection, infrared radiation, and/or any other heat transfer technique. The heating elements can apply heat using flames, gas, electric, infrared, and/or any other suitable heating method. The heating elements can each heat a predefined heating zone (e.g., heating area, heating volume, etc.) (e.g., with directed heat, with more than a threshold proportion of the emitted heat, etc.), heat the entire cavity (e.g., with ambient or indirect heat), or otherwise heat the cavity.

In a first specific example, the appliance can include multiple carbon fiber heating elements. The power output of each carbon fiber heating element can be: between 300 W-600 W, between 440 W-460 W, more than 600 W, less than 300 W (e.g., 400 W, 430 W, 450 W, 460 W, 480 W, 500 W, etc.), and/or any other suitable power output. The maximum temperature of the multiple carbon fiber heating elements can be above, below, or equal to: 300° F., 500° F., 700° F., and/or any other suitable temperature.

In a second specific example, the appliance can include multiple light source heating elements. More specifically, the light source heating elements can emit infrared light to cook the food.

The appliance can define a cavity (e.g., cooking chamber, cooking volume, cook cavity, etc.) that can receive food, accessories (e.g., plate, pan, baking sheet, pot, etc.), and/or other items. The cavity can include one or more racks for positioning the food and/or accessories in the cavity. The cavity can be accessible using the appliance door (e.g., side door, top door, etc.) or otherwise accessed. The cavity can be open, closed (e.g., reversibly sealed by the sealing component), partially open, or otherwise configured. The cavity can be lit, unlit, or have other visual properties. The cavity can include or be associated with one or more fiducials, which can be used to determine a sensor pose relative to the cavity. The fiducials are preferably statically mounted relative to the cavity (e.g., with a known pose, position, and/or orientation), but can alternatively be movably mounted to the cavity. The fiducials can include: visual fiducials (e.g., asymmetric icons, stickers, stamps, bezels, or other features, etc.), wireless fiducials (e.g., Bluetooth beacons asymmetrically mounted to the cavity or housing, wherein the sensor pose can be determined via triangulation or trilateration), and/or other fiducials.

Examples of accessories that can be used include: trays, pots, pans, stones, steels, peels, and/or other cooking accessories. The accessory can define one or more cavity occupancy regions (e.g., a baking sheet with predetermined sections (e.g., predefined occupancy regions), not define occupancy regions, include one or more fiducials (e.g., visual, wireless, etc.), and/or include other orientation or classification features.

The appliance can include memory (e.g., non-volatile, volatile, etc.) that can store one or more states. The appliance can include a processor for sampling and recording cavity measurements, a communication system for receiving and/or transmitting information (e.g., to and/or from the remote computing system, to and/or from a user device, etc.), and/or any other suitable elements. Examples of appliances include: ovens, toasters, slow cookers, air fryers, warming drawers, broilers, cooktops, grills, smokers, dehydrators, and/or any other suitable appliance. A specific example of an appliance is described in U.S. application Ser. No. 16/793, 309 filed 18 Feb. 2020, which is incorporated herein in its entirety by this reference. However, the appliance can additionally or alternatively include any other suitable components.

The system can include one or more sensors for determining measurements (e.g., inference or training). The sensors are preferably integrated into the appliance, but can additionally or alternatively be separate from the appliance. The one or more sensors can include one or more: camera sensors, motion sensors, IMU sensors, depth sensors (e.g., projected light, time of flight, radar, etc.), temperature sensors, audio sensors, door open/close sensors, weight sensors, power sensors (e.g., Hall effect sensors), proximity sensors, and/or any other suitable sensor. The sensors can be directly or indirectly coupled to the cavity. The sensors can be connected to and controlled by the processor of the appliance, a user device, or be otherwise controlled. The sensors are preferably individually indexed and individually controlled, but can alternatively be controlled together with other like sensors. In a first example, the sensors can be mounted to the cook cavity. In a second example, the sensors can be those of a user device (e.g., smartphone, tablet, smartwatch, etc.). However, any other suitable set of sensors can be used.

The one or more camera sensors can include CCD cameras, CMOS cameras, wide-angle, infrared cameras, stereo cameras, video cameras, and/or any other suitable camera. The camera sensors can be used with one or more lights (e.g., LEDs, filament lamps, discharge lamps, fluorescent lamps, etc.), which can be positioned next to the cameras, within a predetermined distance from the camera system, and/or otherwise positioned relative to the camera system. The camera sensors can be externally or internally located relative to the cooking cavity. The camera sensors can be mounted to the cavity wall, wherein the camera lens is preferably flush with the cavity wall, but can alternatively be recessed or protrude from the cavity wall. The camera can be centered along the respective appliance surface, offset from the appliance surface center, or be arranged in any other suitable position. The camera can be statically mounted to the appliance surface, actuatably mounted to the appliance surface (e.g., rotate about a rotational axis, slide along a sliding axis, etc.), or be otherwise coupled to the appliance. However, the sensors can include any other suitable components.

The system can include a processing system that can be local to the appliance and/or remote from the appliance. The processing system can be distributed and/or not distributed. The processing system can be configured to execute the method (or a subset thereof); different processors can execute one or more modules (e.g., one or more algorithms, search techniques, etc.); and/or be otherwise configured. The processing system can include one or more non-volatile computing elements (e.g., processors, memory, etc.), one or more non-volatile computing elements, and/or any other suitable computing elements. However, the processing system can be otherwise configured.

The processing system can include one or more modules, which can include one or more: classification modules, object detector modules, segmentation modules, and/or any other suitable module.

The classification module can include one or more classifiers, which can function to determine one or more classes, such as a cavity occupancy region, food type, count, and/or any other suitable class. The one or more classes can be determined using multiple classifiers, a single classifier, and/or any other suitable number of classifiers. The classifiers can include: neural networks (e.g., CNN, DNN, region proposal networks, single shot multibox detector, YOLO, RefineDet, Retina-Net, deformable convolutional networks, etc.), cascade of neural networks, logistic regression, Naive Bayes, k-nearest neighbors, decision trees, support vector machines, random forests, gradient boosting, and/or any other suitable classifier.

The classifier can be an image classifier, an event classifier (e.g., door open event, weight change event, food insertion event, food removal event, etc.), and/or any other classifier. The classifier can be a multi-class classifier, binary classifier, and/or any other suitable classifier. However, the classification module can additionally or alternatively include any other suitable elements.

The object detection module can include one or more object detectors, which can function to detect foodstuff, detect cooking tools, cooking accessories, fiducials, and/or any other suitable object depicted in an image. The object detector can include: neural networks (e.g., CNN, DNN, region proposal networks, single shot multibox detector, YOLO, RefineDet, Retina-Net, deformable convolutional networks, etc.), Viola-Jones object detection framework based on Haar features, scale-invariant feature transform (SIFT), histogram of oriented gradients (HOG) features, and/or any other suitable object detector.

The segmentation module can include one or more segmentation models, which can function to determine foodstuff segments (e.g., foodstuff masks) for each food depicted in the measurement. The segmentation model can be used with the classifier (e.g., the foodstuff masks can be combined with the image to determine an occupancy region for the particular food instance), the object detector (e.g., to segment an image based on the detected object), and/or used with any other suitable algorithm or not used with other algorithms. The segmentation model can be a semantic segmentation model, an instance-based segmentation model, and/or any other suitable segmentation model. The segmentation model can be k-nearest neighbor clustering algorithms, gradient-based algorithms, and/or any other suitable algorithm. However, the processing system can be otherwise configured.

The system can include one or more datastores, which can include one or more zone class to heating element mappings (e.g., lookup table, lists, etc.); training data for training the one or more classifiers, and/or any other suitable information. However, the datastore can additionally or alternatively include any other suitable components and/or elements.

The system can be used with one or more predetermined cavity occupancy regions (e.g., zones). The zones can be defined relative to the cavity (e.g., in the cavity frame of reference, in the cavity coordinate system, relative to a cavity reference point, etc.), relative to the camera (e.g., relative to the camera's field of view, within the image frame of reference, within the image's coordinate system, etc.), be defined based on an accessory (e.g., relative to a reference on the accessory), heating element arrangement, and/or otherwise defined relative to another frame of reference. The predetermined zones can cooperatively cover (e.g., encompass) the entire frame of reference (e.g., entire image, entire cavity, entire accessory, etc.), a portion of the frame of reference (e.g., less than 99%, 90%, 80%, 60%, 50%, etc. of the image, cavity, accessory, or other reference, etc.), and/or any other suitable portion of the frame of reference.

The frame of reference can be divided (e.g., evenly or unevenly) into one or more zones: laterally, longitudinally, vertically, radially, arcuately, along a diagonal, along any other suitable axis, in a grid, and/or otherwise divided. When the cook cavity includes multiple vertical levels or tiers, the zones can correspond to each tier, a subregion of each tier (e.g., wherein the space between adjacent tiers can be subdivided into zones), be treated as a single zone, or be otherwise split into zones.

In a first example, the frame of reference (e.g., cooking cavity, image, etc.) can be split front-to-back into multiple unit zones, wherein the set of zones can include each unit zone and optionally unique combinations thereof (e.g., front, middle, back, front-middle, middle-back, front-back, front-middle-back, etc.). In a second example, the frame of reference (e.g., cooking cavity, image, etc.) can be split left-to-right into multiple unit zones, wherein the set of zones can include each unit zone and optionally unique combinations thereof (e.g., left, middle, right, left-middle, middle-right, left-right, left-middle-right, etc.). In a third example, the frame of reference (e.g., cooking cavity, image, etc.) can be split left-to-right and front-to-back into a grid of unit zones, wherein the set of zones can include each unit zone and optionally unique combinations thereof. In a first illustrative example, the grid can define 6 zones: front-right, back-right, front-mid, back-mid, front-left, and back-left. In a second illustrative example, the grid can define 5 zones: front, back, mid, left, and right. In a third illustrative example, when the zones are laterally defined, the zones can include back, mid, and front. In a fourth illustrative example, when the zones are horizontally defined, the zones can include: left, mid, and right. In a fifth illustrative example, when the zones are vertically defined, the zones can include: upper, middle, and lower. However, the zones can be otherwise determined.

The zones can be a uniform size, different sizes, any other suitable size. The size of each zone can be based on radiant heat available from the heating elements, the number of heating elements, the placement of heating elements, the size of the heating elements, arbitrarily determined, determined based on the spacing between support structures (e.g., the rack spacing, etc.), determined based on observed user behavior (e.g., positions that the user places foodstuff within the cavity), determined based on expected user behavior (e.g., expected and/or predicted locations that the user will place foodstuff in the cavity), and/or based on any other information. An example of the zone size being determined based on user behavior (e.g., observed or expected) can include determining that users are likely to place the foodstuff in a particular region of the cavity (e.g., front, back, mid, etc.). The particular region can be partitioned into multiple zones (e.g., a larger number of smaller zones; smaller zones than other, less-used cavity regions, etc.) to enable more control for targeted heating.

Each zone can be associated with one or more heating elements (or combinations thereof). Each zone can be aligned with one or more heating elements, aligned with sections on an accessory, and/or otherwise arranged. The number of zones is preferably associated with the number of heating elements (e.g., a multiple or fraction of the number of heating elements), but can additionally or alternatively not be associated with the number of heating elements, be arbitrarily determined, be manually determined, or be otherwise determined. The number of zones can be: 1, 2, 3, 4, 5, 6, 7, 8, 9, 10, between 2-4, between 5-10, between 5-8, between 5-7, between 2-10, between 2-8, less than 3, less than 4, less than 5, less than 6, less than 7, less than 8, less than 9, less than 10, less than 15, less than 20, and/or any other suitable number of zones. The extent of each zone is preferably associated with a respective heating element's thermal extent (e.g., cavity region that the heating element can heat), but can additionally or alternatively be larger or smaller. The zones can be adjacent, overlapping, or nonadjacent (e.g., separated by a gap, such that food cannot be contained completely within the gap). Each zone can include one or more adjacent subregions defined along at least one axis of the cavity, and/or be otherwise defined. Each zone can be 2D, 3D, and/or have any other suitable set of dimensions. Each zone can have a particular geometry (e.g., rectangle, square, circle, ovular, rounded rectangle, etc.), an arbitrary geometry, and/or other geometry. The geometry can be associated with (e.g., defined by): the heating element, the heating extent of the heating element, the shape of the cavity, an accessory, the geometry can be associated with a heating element or arrangement of multiple heating elements, and/or otherwise defined.

Each zone can be identified by a zone class, by a zone identifier, be associated with a pixel index, and/or be otherwise identified. In a specific example, (e.g., the example shown in FIG. 6), each of the 7 classes in such a classifier represents a combination of food occupied or unoccupied across three statically defined zones (Zone 0, Zone 1, Zone 2; back, mid, front; etc.).

In one example, the predetermined zones include multiple zones that cooperatively cover all (or a portion thereof) of a view of the cavity depicted in an image captured by a camera (e.g., top-down view, top-side view, top-corner view, etc.).

In a specific example, the field of view of the camera can be segmented into zones. Additionally or alternatively, zone delineators can be overlayed on images and/or separate from the images. The zones (e.g., zone segments, zone delineators, zone identifiers, etc.) can be fed as input into the zone classifier, and/or otherwise used to determine the occupied regions.

The system can be used with one or more instruction elements, which can include: recipes, cook programs, cook primitives, operation instructions, target parameters (e.g., target temperature, target power output, etc.), cook instructions, and/or any other suitable instruction elements. The instruction elements can be specific to an appliance type or class, or globally applicable. The instruction elements can be specific to a set of heating elements (e.g., specific heating element identifiers, relative heating element arrangement, number of heating elements, etc.), all heating elements, any heating element, and/or any other arrangement of heating elements.

In a first example, the instruction elements associated with the food type (e.g., determined from the measurement) can be assigned to the heating elements associated with the zone that the food type is arranged within or occupying.

In a second example, the instruction elements (e.g., bake, convection bake, etc.) are associated with all heating elements.

In a third example, the instruction elements (e.g., targeted heating, such as broil, toast, grill, etc.) are associated with a subset of heating elements (e.g., predetermined number of heating elements, predetermined spatial pattern of heating element power output, etc.).

Each instruction element can be associated with a predetermined food type class (e.g., represents a single food type, multiple food types, etc.). Each instruction element can be associated with one or more predefined versions that represent a modified instruction based on one or more occupied zones (e.g., per heating element associated with the occupied zone(s)). The predefined versions can be defined based on food parameter value combinations (e.g., type(s), zone (s), count(s), quantity, accessory, etc.) or otherwise determined.

Each instruction element can additionally or alternatively be associated with a generic version that includes placeholder parameters (e.g., for occupied zone(s), count(s), quantity, accessory, etc.). Each parameter value can be associated with generic instructions that can be applied based on the parameter value.

In variants, the generic instructions can be transformed (e.g., symmetric, rotation, translation, etc.) based on the parameter value.

In a first example, the placeholder parameter is associated with an occupied zone. The instruction element can include generic instructions that can be applied to the heating element(s) associated with the occupied zone and/or zone combination.

In a second example, the generic instructions can be defined for a set of heating elements. The generic instructions can be transformed based on the determined zone class (e.g., symmetric transformation about the middle zone, extension to other zones, etc.). However, the instruction elements can additionally or alternatively include any other suitable elements.

However, the system can additionally or alternatively include and/or be used with any other suitable components and/or elements.

5. METHOD

The method for targeted heating element control can include: sampling measurements S100, determining one or more occupied regions based on the measurements S200, determining one or more food types S300, controlling appliance operation based on the occupied regions and food types S400, optionally providing real-time feedback to the user for food placement within the cavity S500, optionally determining a cavity occupancy region classifier S600, and/or any other suitable elements.

All or portions of the method can be performed in real- or near-real time, or asynchronously with image acquisition and/or the cook session. All or portions of the method can be performed at the edge (e.g., by the appliance, by a user device connected to the appliance, etc.) and/or at the remote computing system.

The method can be performed after a predetermined event (e.g., door open, door close, door open and door close), after receiving user input (e.g., cook instruction), after receiving a user device instruction (e.g., based on the cook program associated with the scroll or dwell position within a recipe), periodically, and/or at any other suitable time.

5.1 Sampling Measurements S100

Sampling measurements S100 can function to sample measurements from one or more sensors for subsequent occupied region determination (e.g., zone class determination) and/or food type determination. The measurements can be sampled by the camera and/or any other suitable sensor (e.g., as described above). The measurement set can include inference measurements, training measurements, and/or any other measurements.

Figure 6:
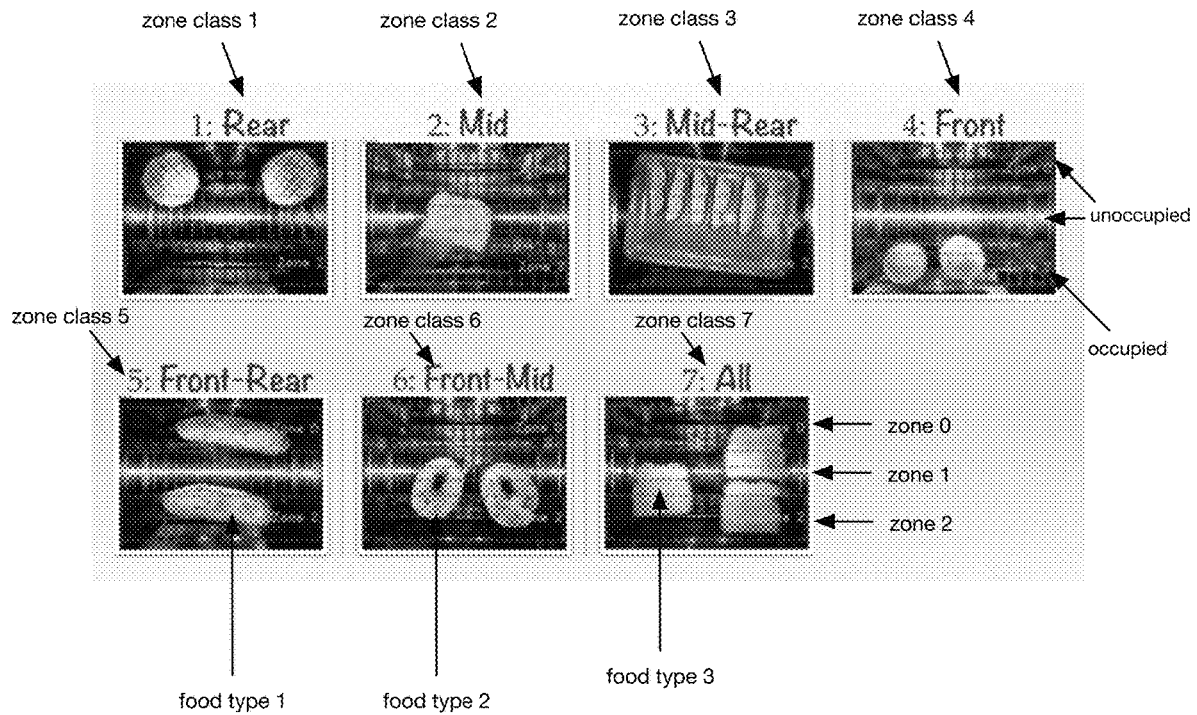
FIG. 6 depicts an example of the method.

The measurements preferably include one or more images (e.g., RGB, RGB-D, greyscale, temperature, etc.), but can additionally or alternatively include: videos, audio, vibration, weight measurements, light sensor measurements, temperature measurements, and/or any other suitable measurements (e.g., examples are depicted in FIG. 6). The images preferably depict a top-down view of the cavity, but can additionally or alternatively depict a side view, a top side view, a top corner view, or any other view. In some embodiments (e.g., when the system includes multiple cameras), the views depicted in images from the multiple cameras can be determined based on user behavior (e.g., where users are expected to place food), based on synthesizing depth data, and/or otherwise determined. The views can be determined based on cameras angled at a predetermined angle or unangled. The views can be a collection of different views from multiple camera locations in the cavity (e.g., sides, back, bottom, top, etc.) to better capture food placement and volume depicted in different views.

The measurements can be sampled in response to a predetermined event (e.g., door sensor triggers, cavity light changes, weight changes, appliance power on, sampling schedule satisfaction, etc.), during an analysis session (e.g., e.g., between a first and second event, after a first event, etc.), after user confirmation of food placement in the cavity, at a predetermined frequency, and/or at any other sampling time.

The measurement can be sampled periodically (e.g., at a predetermined frequency, such as less than 10 Hz, more than 10 Hz, between 5-15 Hz, between 1-50 Hz, etc.), the processing rate (e.g., of a pre-processor, of the computing system, etc.), and/or at any other suitable rate.

The measurements are preferably stored (e.g., in the datastore, in a buffer, etc.) for later processing, but can additionally or alternatively not be stored.

In a first example, S100 can include: detecting a door actuation event (e.g., door open event) and sampling images of the cook cavity using the camera (e.g., mounted to the cook cavity). In a second example, S100 can include: receiving images of the cook cavity that were sampled using a camera (e.g., separate from the cook cavity, mounted to the cook cavity, etc.) responsive to a user input (e.g., user selection of an icon on a user input of a user device or the appliance, such as a touchscreen).

However, measurements can be otherwise sampled.

In variants, sampling the measurements can optionally include processing the measurements, wherein the processed measurements can be used in subsequent processes (e.g., S200-S600). Processing the measurements can include: translating, warping, compositing, cropping, scaling, rotating, and other affine transforms, nonrigid transforms, registering (e.g., into a common reference frame, such as that of the measurements used to train the classifier(s)), rebalancing, and/or otherwise processing the measurements.

In one example, processing an image can include registering the image. In a specific example, this can include: detecting a known feature (e.g., fiducial), having a known relationship to the cook cavity, within the image; determining a transformation between the detected feature and a target feature pose or appearance (e.g., wherein the target feature pose or appearance can be that associated with the images used to train the classifier(s)); and applying the transformation to the remainder of the image (and/or an image segment depicting the cavity, the food instance(s), etc.).

Processing the measurements can include: combining one or more measurements (e.g., averaging, subtracting, adding, etc.), processing one or more elements using a sequential classifier (e.g., recurrent neural network, convolutional neural networks, hidden Markov models, decision trees, etc.), and/or any other suitable technique for inferring temporal changes. Different measurement processing methods can be applied for different cooking stages, appliances, food classes, and/or otherwise applied; alternatively, the same measurement processing method can always be applied.

In one example, a food browning score can be detected as a cook session progresses and the score can be used to reduce heating levels to avoid burning the food.

However, the measurements can be otherwise processed.

5.2 Determining One or More Occupied Regions Based on the Measurements S200

Determining one or more occupied regions based on the measurements S200 can function to determine food location within the cavity. An occupied region can include occupancy regions that are classified as containing food. Each occupancy region can include one or more zones. Each occupancy region can include a different combination of zones, a single zone, or be otherwise defined. An occupied region can be a single zone, multiple zones, and/or otherwise defined. Each occupied region (e.g., zone class) can define one or more zones that represent a portion of the cavity. Each zone can be occupied, partially occupied (e.g., a fraction, a percentage, etc.) or unoccupied by foodstuff. A zone can be considered occupied if a predetermined area of the zone is occupied by foodstuff (e.g., less than 20%, less than 50%, less than 60%, less than 80%, less than 90%, more than 90%, between 20-100%, between 10-100%, etc.) and/or otherwise considered occupied.

In a first variant, each zone class can represent both single zones and zone combinations (e.g., "zone 1", "zones 1 and 2", "all zones", etc.). For example, when food is located in both zone 1 and zone 2, the determined zone class can be "zones 1 and 2."

In a second variant, each zone class can represent a single zone, and the classifier can predict multiple zone classes when the food occupies multiple zones (e.g., occupied zones can be associated with higher confidence scores, unoccupied zones can be associated with lower confidence scores). For example, when food is located in both zone 1 and zone 2, the determined zone class can be "zone 1" and "zone 2."

Each zone can be associated with: a confidence score (e.g., value between 0-1, value between 0-100, etc.) determined by the classification module, a binary output (e.g., include a 1 or 0 for each zone class), and/or associated with any other suitable information.

Determining the one or more occupied regions can be performed before determining the one or more food types (e.g., before S300), concurrently with S300, after S300, and/or at any other suitable time. When foodstuff instances are determined, determining the one or more zones can be performed after determining foodstuff instances (e.g., foodstuff masks), wherein the foodstuff masks can be used as input in addition and/or alternatively to the image to determine the occupied region using the zone classifier. Alternatively, S200 can be determined before, after, independent of, and/or with any other suitable relationship to determining the foodstuff instances.

Determining the one or more occupied zones can be performed within a predetermined time after sampling the measurements and/or processing the measurements (e.g., less than 5 ms, less than toms, less than 20 ms, less than 25 ms, less than 30 ms, less than 50 ms, less than 100 ms, less than 200 ms, less than 300 ms, less than 400 ms, less than 500 ms, between 10-30 ms, between 15-25 ms, between 50-300 ms, between 50-150 ms, between 100-300 ms, 100 ms, 200 ms, 300 ms, 400 ms, 500 ms etc.) and/or performed at any other suitable time. The one or more occupied zones can be determined in parallel with determining the food type in S300. Both the food type and the occupied zones can be determined within the same predetermined period after sampling the measurements or determined within different predetermined periods (e.g., the predetermined period can be longer than the period for determining the occupied zones).

Determining the one or more occupied regions can optionally include determining whether a zone is either occupied by food or unoccupied (e.g., as depicted in FIG. 6), a portion of each zone that is occupied by food (e.g., zone fullness), and/or determining any other zone information.

In a first variant, the one or more zones can be determined using one or more classifiers (e.g., zone classifier), which can function to determine one or more zone classes from a set of zone classes based on the input to the classifier (e.g., measurements from S100; the predefined zones; output of a segmentation model, such as foodstuff masks; etc.). The one or more zones can be determined based on a single image, multiple images (e.g., from the same sampling epoch, same sampling session, etc.), and/or any number of images. The output of the classifier can include an indication of whether a zone is occupied and/or not occupied, the fullness of an occupied zone (e.g., percentage, fraction, etc.), which zones are occupied, and/or any other suitable output.

In a first example, the classifier output can be a probability distribution over multiple zone classes. One or more zone classes can be selected based on the probability distribution (e.g., zone class associated with the highest probability, multiple zone classes associated with the highest probabilities, classes over a threshold probability, etc.). In this example, the classifier can be a multiclass classifier configured to determine the probability of each of a set of zone classes, but can be another classifier. In a first specific example, for the example zones shown in in FIG. 6, the classifier outputs 7 probability outputs (zone 0, zone 1, zone 0/1, zone 2, zone 0/2, zone 1/2, and zone 0/1/2, corresponding to the rear, middle, rear-middle, front, rear-front, middle-front, and all zones, respectively). In a second specific example, given the image of the two bagels spanning the front and middle zone, the classifier can output the highest probability for its 6th output (e.g., zones 1 and 2).

In a second example, the classifier output can include a binary value for each zone class (e.g., a list of binary values for the cavity), where the binary value can represent whether the zone is occupied (1) or unoccupied (0). In this example, the occupancy of each zone can be determined by a classifier specific to the zone or zone class (e.g., wherein each classifier can be a binary classifier or single-class classifier). In a specific example, for the example zones shown in FIG. 6, the classifier would output a list of 3 probability values, corresponding to Zone 0, Zone 1, Zone 2. Given the image of the two bagels in Front-Mid arrangement, such a classifier would output binary value 1 for Zone 1 and Zone 2; and a 0 for Zone 0.

In a first embodiment, the zone classes are determined using a single classifier that ingests one or more images and determines a probability distribution over a set of zone classes. The zones with the highest probability can be selected as the output occupied region.

In a second embodiment, the zone classes are determined using a single classifier that ingests one or more input images and outputs the occupied zones and the fullness of each occupied zone.

In a third embodiment, multiple classifiers are used to determine the zone classes, wherein a first classifier determines which zone classes are associated with occupied zones and a second classifier determines the fullness of each occupied zone.

In a fourth embodiment, a classifier determines a probability distribution over multiple classes, wherein each class represents a combination of a zone class and a set of food parameters (e.g., food identifier, food count, etc.). In an illustrative example, the classifier outputs the probability of (salmon, front) and (asparagus, back).

In a fifth embodiment, the method uses an object detector to detect food presence within a predetermined cavity area (e.g., within a predetermined set of pixels).

In a first example, the classifier is a trained neural network, trained using labelled training data generated in Shoot, but can additionally or alternatively include a cascade of neural networks, a decision tree (e.g., based on features extracted from the image), and/or any other algorithm (e.g., as described above).

In a second variant, the one or more zone classes can be determined using one or more fiducials (e.g., lines, patterns, dots, etc.) marked on the food environment (e.g., cavity, on an accessory, etc.), marked on the appliance, and/or any other suitable surface. The fiducial can be recognized in the measurements (e.g., wherein the fiducial is depicted in the measurement) and used to determine the one or more zone classes (e.g., each fiducial is be pre-associated with a zone), such as by aligning the camera view and the predetermined zones.

In an example, the appliance can be labelled with a fiducial and the camera can be positioned such that measurements captured by the camera depict the fiducial. The one or more classes can be determined for a foodstuff by determining a camera pose (e.g., position, orientation, etc.) relative to the appliance based on the fiducial depicted in the measurement, and classifying the foodstuff with a cavity occupancy region based on the camera pose.

Figure 10:
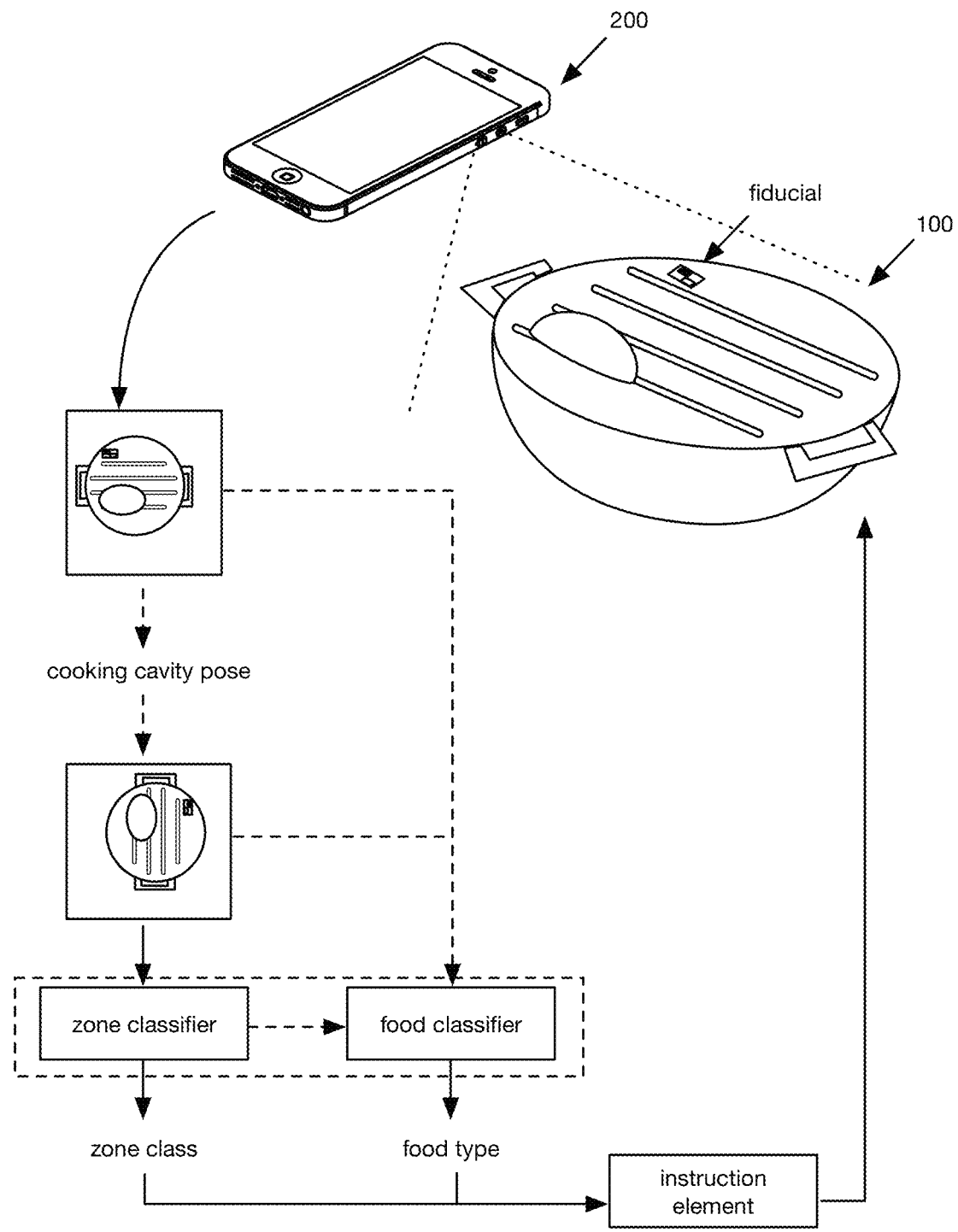
FIG. 10 depicts an illustrative example of a variant of the system and method.

In an illustrative example, a user can sample an image of the cooking cavity using a user device (e.g., a smartphone) or other sensor without a known pose relative to the cooking cavity. The fiducial can be identified in the image, and be used to determine the camera pose (and/or component thereof, such as rotation) relative to the cooking cavity. In a first embodiment (example shown in FIG. 10), the fiducial pose within the image can be used to transform the image and/or the image segment containing the cooking cavity (e.g., rotate the image, warp the image, etc.) to a predetermined orientation (e.g., the orientation that the zone classifier is trained on). The zone classifier can then determine the zone class for any foodstuffs within the cooking cavity using the transformed image. In a second embodiment, the zone classifier can be trained to determine the zone class without preprocessing the image, wherein the zone classifier can leverage the fiducial pose to orient the cooking cavity. However, the fiducial can be otherwise used.

Figure 4:
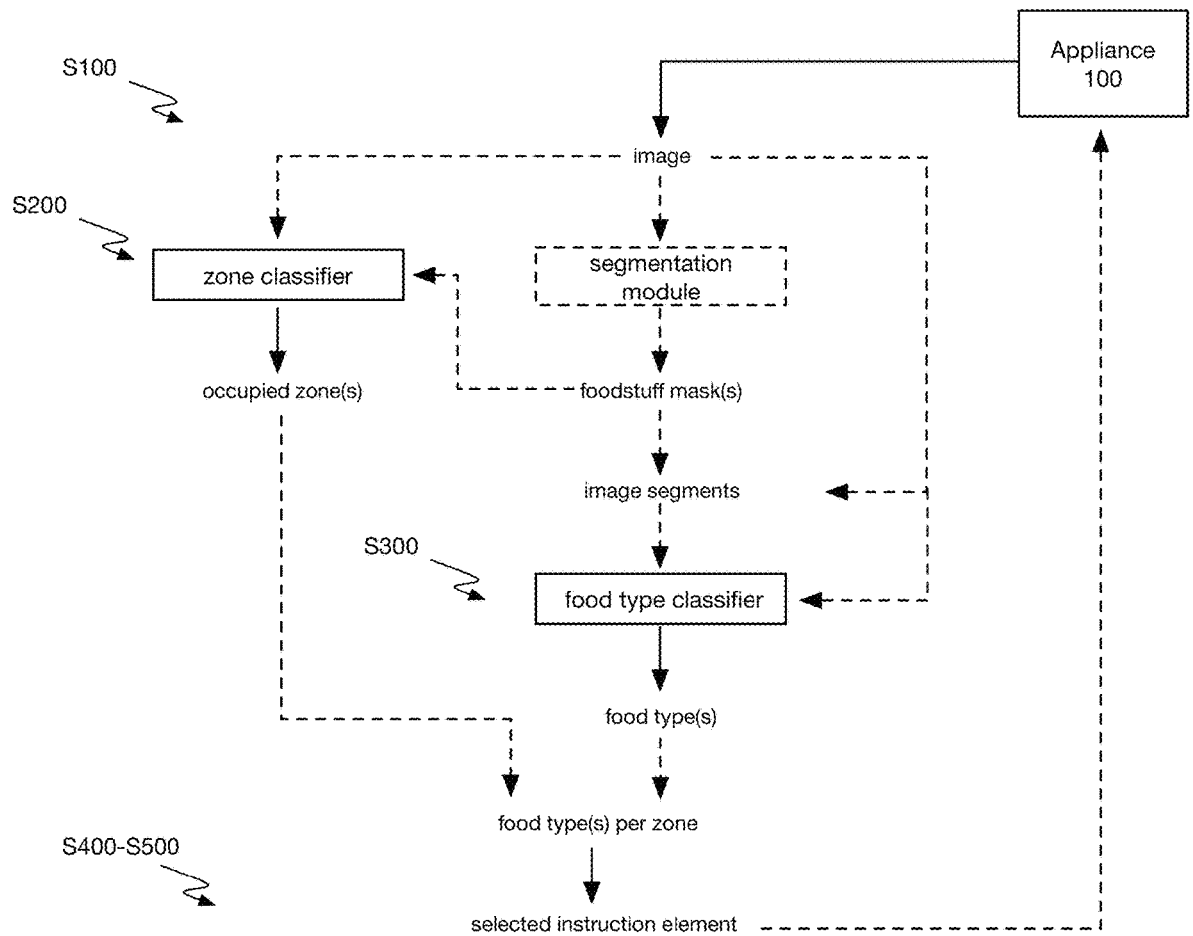
FIG. 4 depicts an embodiment of the method.

In a third variant, the one or more zone classes can be determined using a zone classifier that ingests the foodstuff masks (e.g., each mask depicts a food item) from the segmentation classifier and/or the image (e.g., as depicted in FIG. 4). The zone classifier can associate each food item with a particular zone. The food items within the cavity can then be used to control appliance operation (e.g., by directing heat to food items based on the food item class and the identified zone).

However, the occupied region can be otherwise determined.

5.3 Determining One or More Food Types S300

Determining one or more food types S300 can function to determine the type of food inserted into the cavity for cooking instruction selection in S400.

The food type can be: baked goods, proteins (e.g., chicken, salmon, steak) carbohydrates (e.g., bagel, toast, bread, etc.), vegetables, any other suitable food type. The food type class can be associated with a single food type, multiple food types, and/or any other suitable food types. The food type class can be associated with a confidence score (e.g., value between 0-1, value between 0-100, etc.) and/or associated with any other information.

The food types can be determined after S200, concurrently with S200, before S200, and/or at any other suitable time. The food type(s) can be determined from the same image as S200, a different image, a segment of the S200 image, or any other suitable image. Determining the one or more food types can be performed within a predetermined time after sampling the measurements and/or processing the measurements (e.g., less than 5 ms, less than 10 ms, less than 20 ms, less than 25 ms, less than 30 ms, less than 50 ms, between 10-30 ms, between 15-25 ms, etc.), and/or performed at any other suitable time.

Figure 3:
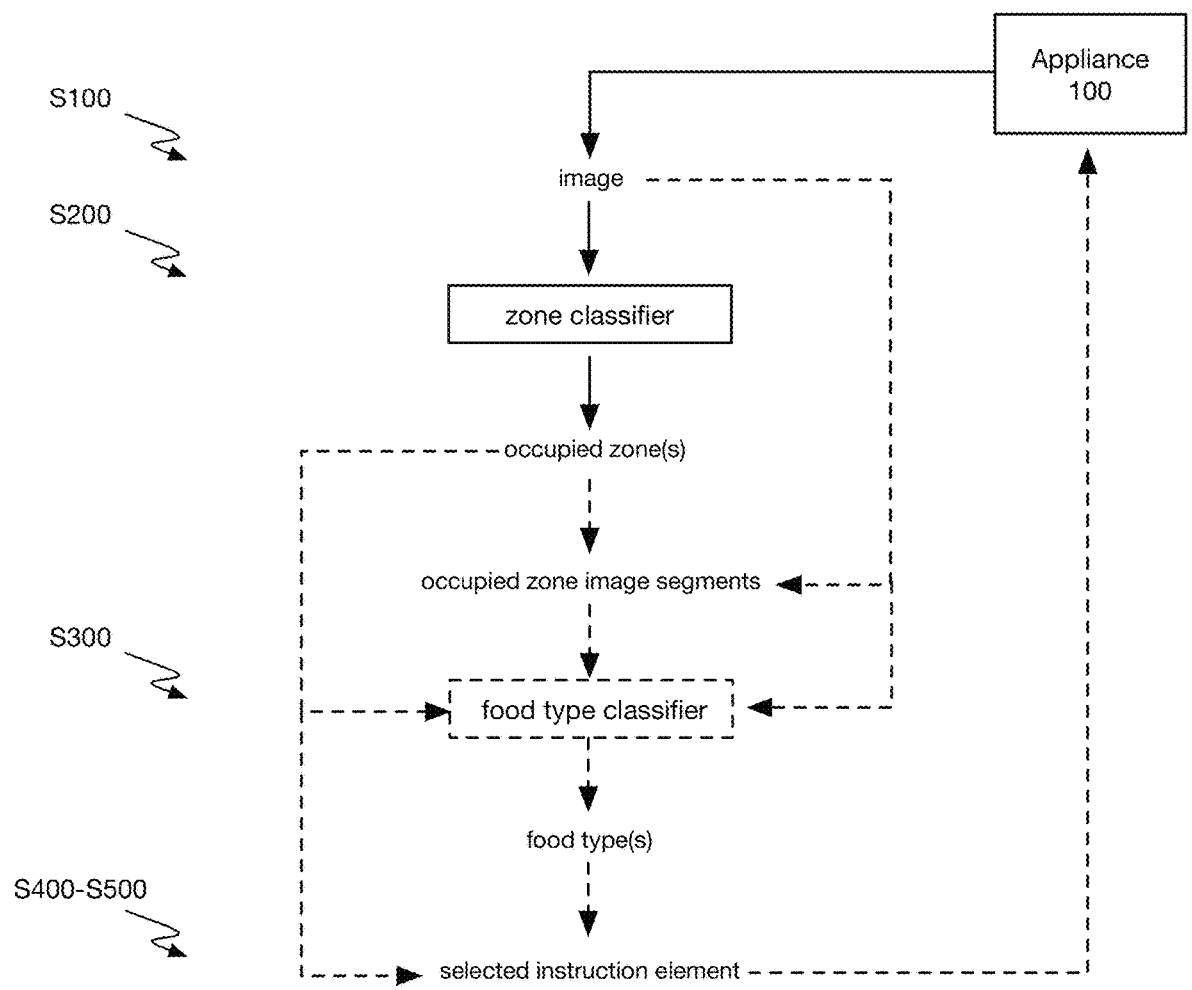
FIG. 3 depicts an embodiment of the method.

In a first variant, the one or more food types can be determined using one or more classifiers. The classifier(s) (e.g., food type classifier) can be used to determine one or more food types depicted in the input image (e.g., image, segment, etc.), food type per occupied zone, food type per image segment, and/or any other suitable output. The classifier(s) can ingest one or more measurements, occupied zone boundaries from S200, occupied zone image segments (e.g., segmented image based on occupied zone edges), foodstuff image segments, foodstuff masks, and/or any other suitable information (e.g., as depicted in FIG. 3).

In a first example, each input can be the image segment corresponding to an occupied zone segment (e.g., to determine the food type for a particular zone), wherein the pixels of the image segment associated with the occupied zone can be cropped and analyzed.

In a first embodiment, the food type classifier can ingest one or more images and determine the food type class (e.g., independent from zone classification).

In a second embodiment, the food type classifier can ingest one or more images and occupied zones and determine a food type class for each occupied zone. In a specific example, the food type classifier can use an attention layer (e.g., that can receive a particular zone as a parameter or not receive a parameter) to attend to specific image regions corresponding to the occupied zone.

In a third embodiment, multiple versions and/or the same version of the food type classifier can ingest occupied zone image segments to determine a food type class for each segment.

In a fourth embodiment, multiple versions and/or the same version of the food type classifier can ingest foodstuff image segments (e.g., from instance based segmentation of the image). The food type classifier can determine a food type for each image segment (e.g., assign a food type to each foodstuff segment). The output of the zone classifier can include a zone class for the particular image segment. The zone class and the food type per image segment can be used to control the appliance according to the different food types within the various occupied zones of the appliance (e.g., to enable custom cooking based on food type and location within the appliance).

Figure 5:
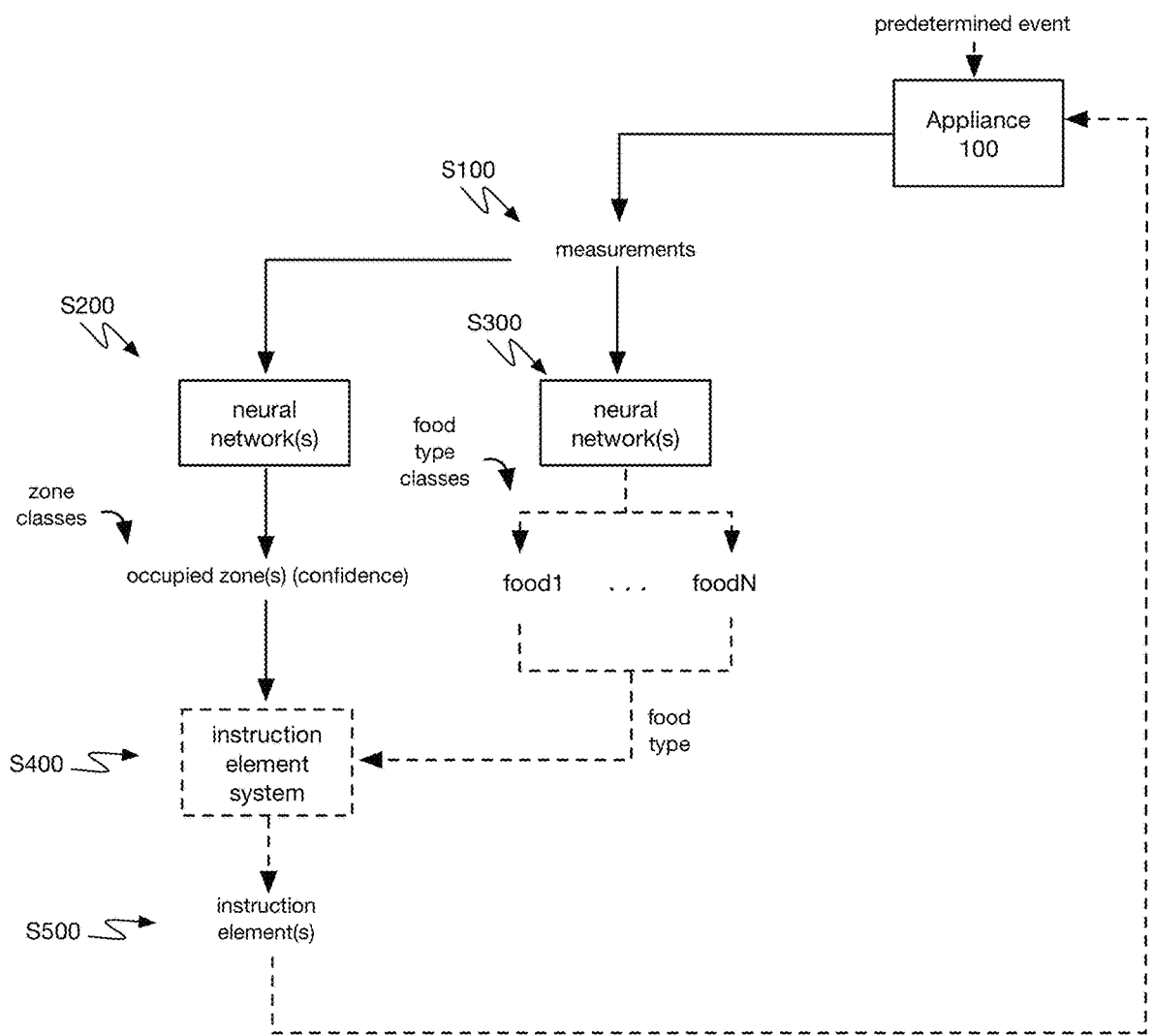
FIG. 5 depicts a variant of the method.

In a second example, the food type classifier is a trained neural network, trained using labelled training data generated in S600, but can additionally or alternatively include a cascade of neural networks, a decision tree (e.g., based on features extracted from the image), and/or any other algorithm. An example of the food type classifier is depicted in FIG. 5.

In a second variant, the one or more food types can be determined based on user food type selection.

However, the food type can be determined using any of the methods disclosed in: U.S. application Ser. No. 16/793,309 filed 18 Feb. 2020, U.S. application Ser. No. 16/380,894 filed 10 Apr. 2019, U.S. application Ser. No. 17/311,663 filed 18 Dec. 2020, U.S. application Ser. No. 17/345,125 filed 11 Jun. 2021, U.S. application Ser. No. 17/245,778 filed 30 Apr. 2021, U.S. application Ser. No. 17/201,953 filed 15 Mar. 2021, U.S. application Ser. No. 17/216,036 filed 29 Mar. 2021, U.S. application Ser. No. 17/365,880 filed 1 Jul. 2021, and/or U.S. application Ser. No. 17/376,535 filed 15 Jul. 2021, each of which are incorporated herein in their entireties by this reference.

Determining one or more food types can optionally include associating one or more food types with one or more particular occupied zones (e.g., automatically, using heuristics, rules, object detection, an additional classifier, etc.; manually; etc.).

However, the food types can be otherwise determined.

5.4 Controlling Appliance Operation Based on the Occupied Regions and Food Type S400

Controlling appliance operation based on the occupied regions and food type S400 can function to automatically select an instruction element based on the occupied zones from S200 and the food type(s) from S300 (e.g., as depicted in FIGS. 3 and 4). Appliance operation can include automatically cooking the food and notifying the user to remove the cooked food, setting a timer to alert the user of cooking completion, and/or any other operation. Automatically cooking the food can include selectively operating heating elements associated with the cavity occupancy region (e.g., as defined by the instruction element), cooking the food using all heating elements, and/or otherwise cooking the food.

Controlling appliance operation can include determining an instruction element (e.g., described above) based on the food type and operating the appliance based on the instruction element.

In a first variant, determining an instruction element can include automatically selecting a version of the instruction element based on the food type, occupied region, and/or any other parameter (e.g., count, quantity, accessory, etc.), and controlling the appliance using the instruction element.

In a second variant, determining an instruction element can include dynamic instruction element generation based on the zone class and/or other parameters described above. Dynamic instruction element generation can be performed based on the occupied zone classes. The occupied zone classes can be used for selecting and controlling heating elements associated with the occupied zone classes based on generic instructions associated with the food type (e.g., retrieved from the mapping stored in the datastore).

Instruction elements can be dynamically adjusted based on a food type combination occupying the same zone and/or a food type combination within the same cavity and occupying different zones.

In a first variant, dynamically adjusting the instruction element can include retrieving the particular heating elements associated with the zone class from the mapping in the datastore.

In a second variant, dynamically adjusting the instruction element can be performed by: averaging the heating element radiant heat based on the food type combination, setting different timers to start different processes within an instruction and/or different instructions per food type based on a set of rules, adjusting heating element power using a scaling factor, and/or otherwise adjusting the instruction element.

In one example, a dynamic instruction can include periodically turning heating elements on or off or otherwise vary their power over time. The heating pattern can be different for different food types (e.g., determined based on the food type) or the same for all food types.

However, appliance operation can be otherwise controlled.

5.5 Providing Real-Time Feedback to the User for Food Placement within the Cavity S500

Providing real-time feedback to the user for food placement within the cavity S500 can function to facilitate food placement within a particular zone in the cavity, wherein the particular zone can be: dynamically determined (e.g., based on distance from other foods or food types already in the cavity), selected, retrieved (e.g., the optimal location for the food type class), or otherwise determined.

The real-time feedback can be visual cues displayed on a user interface (e.g., screen on the appliance, user device, etc.), audio cues (e.g., from the appliance, user device, etc.), any other suitable cues or directives.

The real-time feedback can be provided as the user is placing food in the cavity, after the user opens the appliance door, and/or at any other suitable time.

In a first variant, providing real-time feedback can include providing an image and/or video of the cavity with overlaid zone boundaries, the current location of the food, and the target zone and/or location for the food. The target zone (e.g., entire zone, boundary, etc.) can light up when the food is located in the target zone.

In a second variant, providing real-time feedback can include audio cues that direct the user where to move the food so that the food is in the target zone.

In a third variant, providing real-time feedback can include visual and audio cues that can be used in combination to guide food placement.

Alternatively, the determined zone classes can be used to automatically determine a region of interest (ROI) and zoom level for user viewing (e.g., live video streaming during a cooking session).

In a fourth variant, providing real-time feedback can include halting the cook program until the user implements the feedback (e.g., correct food placement, override the feedback, etc.).

However, real-time feedback can be otherwise provided.

5.7 Determining a Zone Classifier S600

Figure 11A:
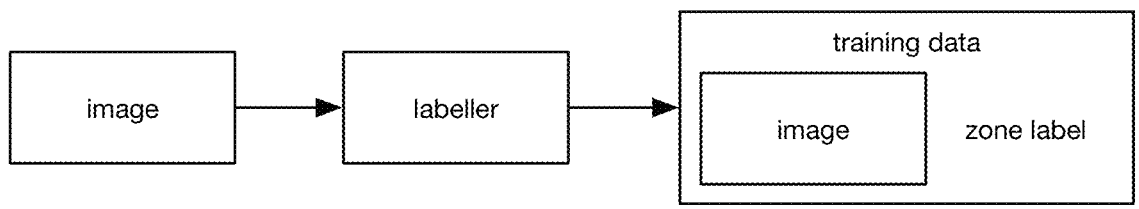
FIGS. 11A and 11B depict examples of generating training data and training the classifier, respectively
Figure 11B:
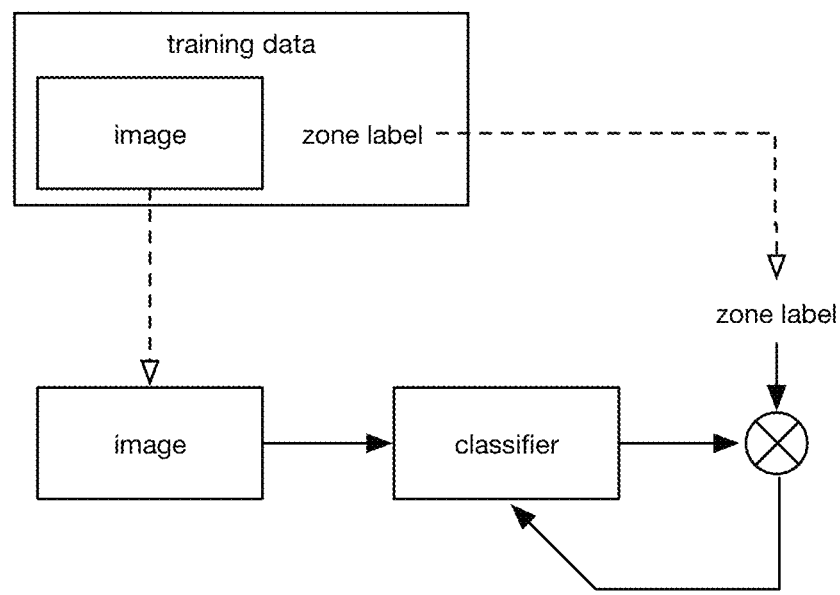

Determining a zone classifier Shoo can function to enable zone class determination in S200 (e.g., using the zone classifier). The zone classifier can include one or more classifiers. The zone classifier can receive images, zone boundaries, segmentation outputs (e.g., foodstuff masks, foodstuff image segments, occupied region segments, etc.), and/or any other suitable information as input. The zone classifier can output one or more zone classes that are occupied, a confidence score per zone, and/or any other suitable information. The zone classifier is preferably a trained classification neural network, but can additionally or alternatively be a logistic regression, and/or any other suitable classifier listed above. The zone classifier can be trained using supervised learning (e.g., example shown in FIG. 11B), unsupervised learning, semi-supervised learning, adversarial learning, and/or any other suitable learning method. Determining the zone classifier can include generating training data using the predetermined zones. The training data can include images with associated cavity occupancy region labels (e.g., separate from the images, overlayed on the images, etc.; example shown in FIG. 6 and FIG. 11A), and/or any other suitable information.

The zones can be labelled: manually (e.g., by a human), automatically (e.g., using one or more object detectors, classifiers, rules, heuristics), and/or otherwise labelled. The labels can be determined by a labeller. The labeller can be: a user (e.g., that manually labels the data), a second neural network (e.g., more accurate neural network, slower neural network, etc.), and/or any other suitable labeller.

In a first example, generating the training data can include overlaying the predetermined zones on a training image (e.g., by aligning the zone indicators with a cavity feature, with an image reference point, etc.). The zones, overlaid on the image, can be labelled as occupied or unoccupied.

In a second example, generating the training data can include labelling the zones based on the training image directly, wherein the zones are depicted in the image (e.g., defined by the appliance, defined by an accessory, such as the accessory can be portioned into zones, etc.).

An example of generating the training data can divide the cavity into three non-overlapping, noncontiguous zones: a front, middle, and back zone. The middle zone can be thinner than the front and back zones (e.g., for ease of classification, to generate less ambiguous training data). The labels can include different permutations of zone combinations (e.g., "back", "front-middle," "all"), wherein the classifier is trained on the labelled images (e.g., as depicted in FIG. 6). However, any suitable number of zones can be overlaid in any suitable configuration.

Determining the zone classifier can include training the zone classifier using training measurements (e.g., form S100).

In a variation, training the zone classifier can include generating a set of weights that define the zone classifier.

In a specific example, the method includes training a 7-class classifier that outputs the probability value for each zone class (and/or outputs the zone class with the highest probability). Each zone class represents a combination of discrete, predefined cavity zones (e.g., Zone 0, Zone 1, Zone 3) that are occupied or unoccupied by food. In this example, the zones can be rectangular, where the zone dimensions and pose (e.g., location and orientation) can be determined based on the smart oven's heating element arrangement and respective heating area. However, other classifiers having other outputs can be trained using other training data.

However, the zone classifier can be otherwise determined.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A method, comprising:
    sampling a measurement depicting food within a cavity of an appliance;
    classifying, based on the measurement, the food as being arranged within one of a predetermined set of cavity occupancy regions;
    determining a food type for the food; and
    controlling the appliance operation based on the classified one of the predetermined set of cavity occupancy regions and the food type by selectively operating, from among a set of individually controllable heating elements, one or more heating elements that are associated with the classified one of the predetermined set of cavity occupancy regions,
    wherein each one of the set of individually controllable heating elements is configured to operate in a heating state in accordance with an independently adjustable output power range.

2. The method of claim 1, wherein the measurement comprises an image.

3. The method of claim 1, wherein the appliance comprises a grill or an oven.

4. The method of claim 1, wherein the predetermined set of cavity occupancy regions are defined relative to the cavity.

5. The method of claim 1, wherein the predetermined set of cavity occupancy regions are different sizes.

6. The method of claim 1, wherein controlling the appliance operation comprises:
    selecting a cooking program based on the classified one of the predetermined set of cavity occupancy regions and the food type; and
    using the cooking program to control the appliance operation.

7. The method of claim 1, wherein each one of the predetermined set of cavity occupancy regions comprises a different combination of a set of cooking zones, and wherein the cooking zones comprise adjacent subregions defined along at least one axis of the cavity.

8. The method of claim 1, wherein the measurement depicts multiple foods, and
    wherein determining the food type for the food comprises:
        determining a segment for each food instance present in the cavity using an instance-based segmentation module; and
        assigning a food type to each respective segment using a classification module.

9. The method of claim 1, wherein the classification of the food within one of the predetermined set of cavity occupancy regions is calculated using a trained classification neural network, and
    wherein the trained classification neural network is trained on images with cavity occupancy region labels.

10. The method of claim 1, wherein the appliance comprises a fiducial depicted in the measurement, and wherein the method further comprises:
    determining a camera pose relative to the appliance based on the fiducial; and
    classifying the food arranged within the cavity occupancy region based on the camera pose.

11. An appliance, comprising:
    a cavity; and
    a processing system configured to:
        sample a measurement depicting food within the cavity;
        classify, based on the measurement, the food as being arranged within one of a predetermined set of cavity occupancy regions;
        determine a food type for the food; and
        control the appliance operation based on the classified one of the predetermined set of cavity occupancy regions and the food type by selectively operating, from among a set of individually controllable heating elements, one or more heating elements that are associated with the classified one of the predetermined set of cavity occupancy regions,
    wherein each one of the set of individually controllable heating elements is configured to operate in a heating state in accordance with an independently adjustable output power range.

12. The appliance of claim 11, wherein the appliance comprises a grill or an oven.

13. The appliance of claim 11, further comprising:
    the set of independently controllable heating elements.

14. The appliance of claim 13, wherein the set of independently controllable heating elements comprise infrared heating elements.

15. The appliance of claim 13, wherein the set of independently controllable heating elements are arranged along a top of the cavity.

16. The appliance of claim 11, wherein the processing system is configured to sample the measurement via a camera mounted to the cavity.

17. The appliance of claim 11, wherein the processing system is configured to classify the food within one of the predetermined set of cavity occupancy regions using a first neural network, and to determine the food type using a second neural network.

18. The appliance of claim 11, wherein the food type and the classification of the food within one of the predetermined set of cavity occupancy regions are calculated within 100 milliseconds of sampling the measurement.

19. The appliance of claim 11, wherein the predetermined set of cavity occupancy regions are different sizes.

20. The method of claim 1, wherein the measurement depicts multiple foods, and
  wherein the set of individually controllable heating elements comprise radiant heating elements that are configured to direct radiant heat to cook each one of the multiple foods at different temperatures based upon a location of each respective one of the multiple foods within the cavity.

\* \* \* \* \*